United States Patent
Abou-El-Ella

(10) Patent No.: US 9,072,016 B1
(45) Date of Patent: Jun. 30, 2015

(54) CARE MESSAGING FOR MISSED OR DROPPED CALLS

(75) Inventor: Hassan Abou-El-Ella, Overland Park, KS (US)

(73) Assignee: Sprint Communications Company L.P, Overland Park, KS (US)

( * ) Notice: Subject to any disclaimer, the term of this patent is extended or adjusted under 35 U.S.C. 154(b) by 223 days.

(21) Appl. No.: 13/555,090

(22) Filed: Jul. 21, 2012

(51) Int. Cl.
*H04Q 7/10* (2006.01)
*H04W 36/04* (2009.01)
*H04W 28/24* (2009.01)

(52) U.S. Cl.
CPC .............. *H04W 36/04* (2013.01); *H04W 28/24* (2013.01)

(58) Field of Classification Search
CPC ..... H04W 28/24; H04W 48/08; H04W 72/21; H04W 72/04
USPC ................. 455/414.1, 412.2, 452.1, 418, 419
See application file for complete search history.

(56) References Cited

U.S. PATENT DOCUMENTS

| | | | | |
|---|---|---|---|---|
| 8,369,496 | B2* | 2/2013 | Deshpande et al. | 379/88.18 |
| 2008/0260122 | A1* | 10/2008 | Conway et al. | 379/112.01 |
| 2010/0303227 | A1* | 12/2010 | Gupta | 379/266.06 |
| 2012/0213341 | A1* | 8/2012 | Jaiswal et al. | 379/88.01 |
| 2014/0050309 | A1* | 2/2014 | Teitelman et al. | 379/88.01 |

\* cited by examiner

*Primary Examiner* — Ajit Patel
*Assistant Examiner* — Julio Perez

(57) ABSTRACT

Embodiments of the disclosure relate to a method of processing a voice call from a mobile device to a customer care center, including placing, from a mobile device, a call to a customer care center. The method also includes displaying, on the mobile device, a first query about whether the call was completed to the satisfaction of the customer, analyzing, on a processor, a status of a first response by a customer to the first query, and displaying, on the mobile device, a first customer care message on the mobile device if the first response was negative.

14 Claims, 6 Drawing Sheets

CARE MESSAGING FOR MISSED OR DROPPED CALLS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Obtaining customer support or customer care can be a difficult and arduous process. Many customer care service centers have grown, and have been augmented with complicated call routing and queuing systems. Automated greetings are common. Keypad entry of customer information is sometimes requested. At busy times of the day, the wait in a call queue may extend several minutes. Customers generally prefer to use these call care centers rather than seek help from a retail employee at a general merchandise store.

SUMMARY

Embodiments of the disclosure relate to a method of processing a voice call from a mobile device to a customer care center, comprising placing, from a mobile device, a call to a customer care center. The method also comprises displaying, on the mobile device, a first query about whether the call was completed to the satisfaction of the customer, analyzing, on a processor, a status of a first response by a customer to the first query, and displaying, on the mobile device, a first customer care message on the mobile device if the first response was negative.

Embodiments of the disclosure relate to a method of processing a call from a mobile device to a customer care center, comprising receiving, by a customer care center server, a call from a mobile device over an electronic infrastructure, placing, by the customer care center server, the call in a queue for connection to a live customer care representative, monitoring, by the customer care server, whether the call was successfully completed, and sending, by the customer care server, a first customer care message to the mobile device if the call was not successfully completed.

Embodiments of the disclosure relate to a system for processing a call from a mobile device to a customer care center, comprising an electronic infrastructure configured to route calls from mobile devices to a customer care center, and a customer care server comprising a processor and a non-transitory memory, configured to receive a call from a mobile device over an electronic infrastructure, place the call in a queue for connection to a live customer care representative, monitor whether the call was successfully completed, and send a first customer care message to the mobile device if the call was not successfully completed.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
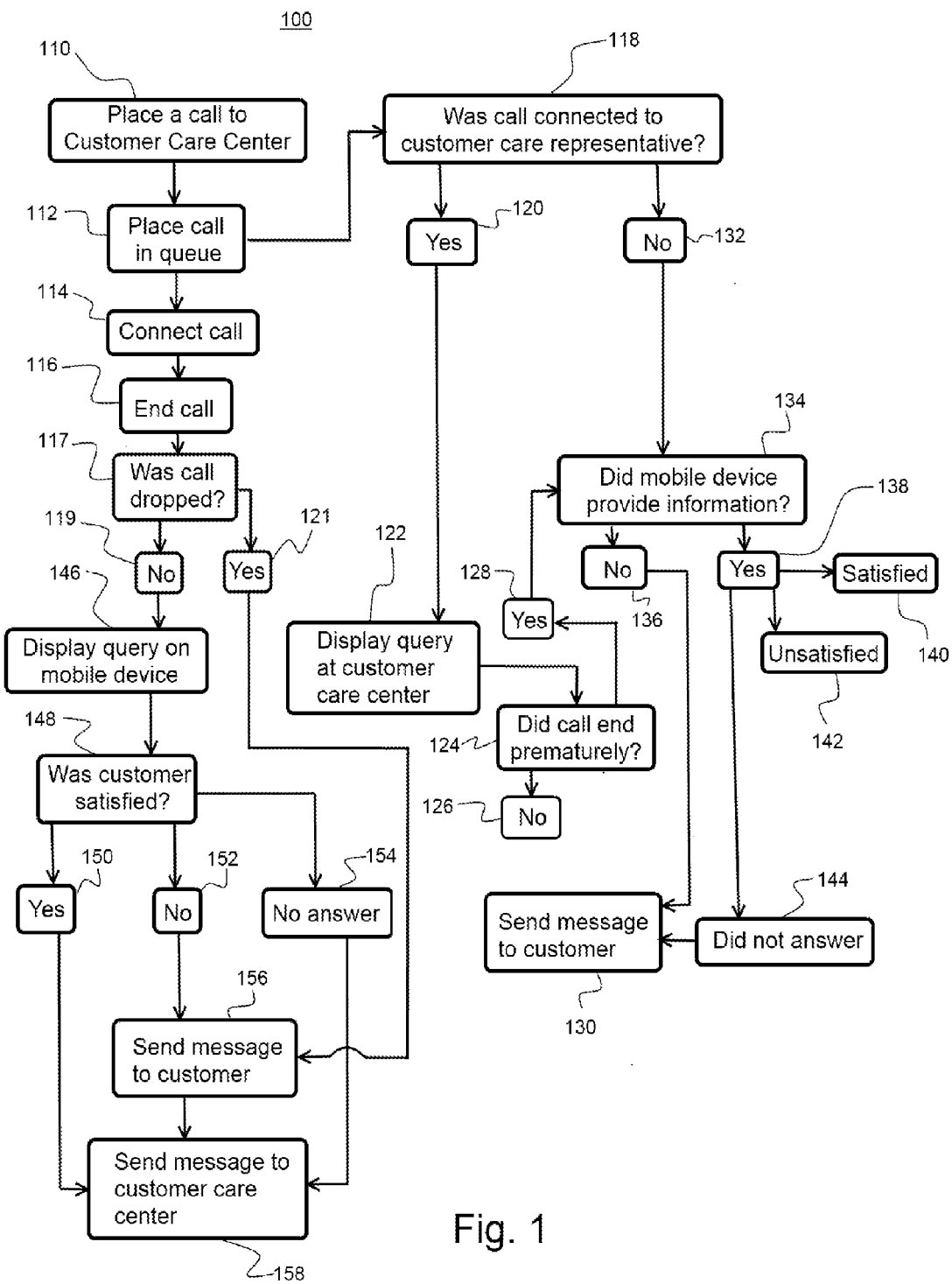
FIG. 1 is a flowchart according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Embodiments of the disclosure relate to remedial technology which addresses a call to a customer care center which may not have been successfully completed. Embodiments of the disclosure relate to identifying the modes of failure, and identifying the information sources which would help to determine which mode of failure occurred.

Obtaining support for a service such as a telecommunications service may be handled with a telephone call to a customer care center. The customer care center has a pool of employees who have been specially trained to help customers with assorted problems they may have in using a telecommunications service, and the software and hardware that form the basis of that service. Calls to the service center may exceed the number of employees in the pool, so the calls may be placed in a queue to be handled in the order they were received, or some order determined by the policy of the telecommunications service.

Calls to customer service do not always go as planned. Numerous possible interruptions may intrude upon the successful conclusion of the call. The customer may be calling from a mobile phone in an area with interference and low signal spots in the wireless coverage. This may mean that the call is dropped at some point before the customer has fully resolved the issue of concern. The call may be dropped in mid-conversation with a representative.

Calls may also fail to complete for other reasons. A call may be erroneously transferred or dropped due to human, software, or hardware error at the customer care center. A customer may become frustrated with the wait time and hang up. A customer may hang up intentionally to attend other pressing matters. The conversation between the customer and customer care representative may progress poorly, and the customer may hang up before complete resolution of the issue. The customer may simply discover the solution to the problem before she or he is assisted by the customer service representative.

The customer may be the most aware if the call was successfully completed. However, the customer may not communicate the failure of resolution to the customer care center. The handset the customer used may be able to detect whether the call was dropped, or if the customer intentionally hung up. The customer care center may be able to record whether the customer was ever connected to a live service representative. If the customer was connected, the customer care representative may have information about whether there was resolution to the customer's issue, and whether the call was terminated in an acceptable manner.

When a call to the customer service center fails, the customer may be left unsatisfied and unhappy. The ideal customer service would identify the unhappy customers, and try to make them happy, or at least, less unhappy. Since there are many modes where a customer service call can fail, it is not always even apparent to the service company that the call failed, or that the customer is unhappy. The customer may, in fact, not be unhappy. As mentioned above, the customer may have realized a solution to the problem without any help, and simply hung up.

Embodiments of the disclosure relate to identifying when a call to a customer care center has failed and sending a remedial message to the customer. A client application on the handset may be used to identify whether a call was dropped or intentionally terminated by the customer. The client application on the handset may further request that the customer indicate whether the call was completed in a satisfactory manner.

Embodiments of the disclosure also relate to identifying at the customer care center when a call to a customer care center may not have completed successfully. The customer care center server may identify when a call is discontinued before the customer is connected to a live customer service representative. The customer care server may query the customer service representatives when a call terminates to estimate whether the customer was satisfied, and their problem resolved. The customer care server may also accept a message from the customer handset indicating whether the call was terminated in a satisfactory manner. If the customer does not respond to any query, the handset may also report that it is not known if the customer is satisfied.

Embodiments relate to the remedial action that may be taken if information indicates that the customer may be dissatisfied. The remedial action may be as simple as an apology for the incomplete call to customer care. The message may be automated and include instructions for bypassing the queue in a return call. The message may be delivered by a live customer service representative calling back the customer when the live customer service representative is available. The message may be sent to the mobile phone of the customer, or e-mail, or a text message, or to an alternative number provided by the customer (e.g. a home telephone number). It may be delivered by any available communication path from the customer care center to the customer.

FIG. 1 shows a flow chart 100 of the elements of handling a call to a customer care center. The method may begin when a customer places a call to a customer care center at 110. If the customer calls from a mobile device 210 (see FIG. 2), a Customer Care Client Application 614 (see FIG. 6A) may be invoked to monitor the wait time and progress of the call, until the call ends. When the call is received at the customer care center, a Customer Care Center Server 260 (see FIG. 2) may begin monitoring the wait time and progress of the call, until the call ends. The call may progress without incident, being placed in a call queue 112, then being connected to a live representative at 114, and when the issue is resolved, the call may be ended at 116. There may be many variations on this progression. There may be no queue, so the call is instantly connected, bypassing 112. The customer may end the call while in the queue, bypassing a connection at 114.

At 117, the issue of whether the call was dropped 117 is raised. If this is done at the mobile device, the mobile device may be able to determine whether a signal from a base station transceiver was lost, and that the call was dropped due to a malfunction in the connection to the customer care center. The flow then progresses to 121, determining in the affirmative that the call was dropped. Here, the system may pass directly to sending the customer a message, such as an apology, since in all likelihood the customer will be dissatisfied. If the mobile device that just dropped communication to the customer care center then asks if the customer is satisfied at 146, the customer may think the mobile device is not so smart.

The mobile device may also be able to determine that the customer pushed a disconnect button, ending the call. In this case, the answer at 119 is no, and the mobile device may be unable to determine whether the customer is satisfied without asking. The flow then progresses to 146, and displays a query to the customer regarding satisfaction. Many different words and styles may be contemplated. The query may be designed to allow the mobile device to analyze whether the customer is satisfied at 146.

The mobile device may be a mobile phone, smart phone, personal digital assistant, tablet computer, or other portable telecommunication device. A client application on the mobile device may monitor the progress of the call, and display a query 146 that may ask whether the customer was satisfied, or an equivalent question. The question could take any form, and may be directed at the basic fact of whether the customer continues to like the company represented by the customer care center, or whether the customer is unhappy, and still has issues. The query may also take the form of a questionnaire or satisfaction survey, and ask about different aspects of the call.

At that point, the answer or answers must be analyzed to determine in a basic way whether the customer was satisfied at 148. The client application on the mobile device may use complex logic to determine whether the customer was satisfied, but ultimately must decide whether to send a follow up message 156 to the customer. For example, the client application may analyze customer responses to a query, and take one set of actions if there is input from the query, and take another set of actions if there is no response. The client application may monitor call progress, and use a plurality of metrics to determine whether the call may have been successful. If the customer was not satisfied, a message 156 may be sent and/or presented to the customer. The message 156 may include instructions for the customer to contact the customer care center again, while bypassing the queue. The message 156 may contain instructions for bypassing only a portion of the queue, essentially giving credit for the amount of time spent in the queue. The message may contain an apology for not providing the customer complete satisfaction. In essence, message 156 may be a remedial message for when the customer is unhappy.

If the customer indicates satisfaction, there is no need to send message 156. The mobile device may send a message to the customer care center at 158 to provide the customer care center with information about the result of the call. There are many scenarios where the customer may be satisfied with the customer care center service, but the customer care center may not be otherwise aware of the customer satisfaction without message 158. For example, while waiting in the queue, the customer may hear recorded information which resolves the issue. The customer may then disconnect the call, and the customer care center may not know why. The customer may also disconnect the call out of frustration due to the wait time or a need to attend to other matters. The customer may simply figure out a solution while waiting in the queue, and hang up.

If the customer provides no answer at 154, the mobile phone may be faced with an ambiguity about whether the call completed to the satisfaction of the customer. The customer may simply ignore or not have the time to express satisfaction or dissatisfaction. In this case, the phone may send a message to the customer care center at 158. The customer care center may have additional information about whether the customer is satisfied.

When the call is placed in a queue at 112, the customer care center may begin monitoring whether the call was connected to a customer care representative at 118. If the customer is connected to a customer care representative, flow passes through 120 with an affirmative determination, and displays a query for the customer care representative at 122. At this point, the customer care representative may be in the best position to ascertain whether the customer received satisfaction.

At 124, the customer care representative may input information into the customer care center server regarding whether the call ended prematurely. A premature end may include where the call was dropped before the issue was resolved, where the customer did not stay on the line until the issue was resolved, or any other situation where the customer care representative thinks that the outcome of the call needs further attention by the customer care center, and/or the customer. If the customer care representative answers in the negative at 126, this may suggest that the call ended properly, and no further action may need to be taken.

If the customer care representative answers in the affirmative that the call ended prematurely, flow will pass to 134, for a determination if the mobile device passed along information. Information from the mobile device may trump information from the customer care center. For example, if the customer indicated satisfaction at the end of a call, that information may trump the customer care representative input that the call ended prematurely. That is why the flow may progress to box 134 before additional decisions are made. If no information is provided by the mobile device, the information from the customer care representative may be the best available. Then, flow progresses through 136 to send a message to the customer at 130.

If the call was not connected to a customer care representative at box 118, flow progresses through a negative determination at 132. Any information received from the mobile device may assist in resolving the situation. Flow progresses to 134 to ascertain the status of information provided by the mobile device. If information was passed, flow progresses through 138. The information passed from the mobile device may indicate one of the responses 150, 152, or 154. If the customer was satisfied, flow progresses to 140, and no further remedial action may be necessary. Of course, this may not preclude any customary conclusory message of "thank you," or the equivalent for example.

If the customer was unsatisfied, flow progresses to 142. In some embodiments, no further action may be performed because the mobile device may have already sent a message to the customer. In some embodiments, a message may be sent if the mobile device may not have already delivered a message, either by design or due to a malfunction. The customer care center may handle calls from both customers with a mobile device constructed in accord with this disclosure and other customers with a mobile phone lacking features described in this disclosure. The customer care center may retrieve information from a customer database to determine which type of mobile device the customer uses.

If the customer did not answer at 144, the customer may be upset. The only two pathways to 144 are through 124 and 132. At 132 it was determined that the customer may not have been connected to a customer service representative. Alternatively, at 124, it was determined that the call may have ended prematurely. Both pathways suggest an unsatisfactory outcome. Flow may then progress from 144 to 130.

A remedial message may be sent at 130 with instructions for the customer to attempt to help them get connected to a customer service representative. For example, time spent in the queue may affect the customer's position in the queue when they call back. Alternatively, there may be instructions for the customer regarding how to inform the customer care center that the customer wants a call back. There may be instructions informing the customer to expect a call back from the customer care center. There may be an apology in message 130. The message may contain any information that helps remedy the situation that the customer called the customer care center, waited, and was not connected to a live service representative.

At box 134, flow may progress to 136 upon a determination that no information was sent from the mobile device regarding the call. The mobile device may not be able to pass information to the customer care center because of poor reception, battery failure, or other problem. Again, the only two pathways to 136 are through 132 and 128, which also suggest an unsatisfactory outcome. If the mobile device does not provide further information, either that the customer is satisfied or that remedial action may have already been taken, an inference may be drawn that the customer may be upset. Flow then progresses from 134 to 130, and a remedial message is sent to the customer.

FIG. 1 is a flowchart to promote description and understanding some embodiments of the disclosure. They are not intended to be complete illustrations of the Applicant's invention. In the most correct sense, they should be viewed as empty boxes with numerical labels that allow reference to and from the detailed description. Textual labels are provided in addition for the convenience of the reader, and in no way should the textual labels be considered a complete statement of the meaning and significance of the box inside which the textual labels are placed. The text of the complete meaning could not be placed inside the box as a practical matter.

It is understood that some of the processing described above as being performed by a computer or server in the customer care center may be provided instead by the client application on the mobile device. For example, if the mobile device is unable to connect to the customer care center or if the customer care center has not been provided with the functionality described herein, the benefits of at least some of the teachings herein may still be provided by the client application on the mobile device. The client application may detect call drop and/or premature call termination and handle this case, for example presenting an explanation to the user and/or messaging with the customer care center to provide for a customer care representative to call back to the mobile device to save the user the trouble of calling into customer care again and possibly waiting in queue again.

Figure 2:
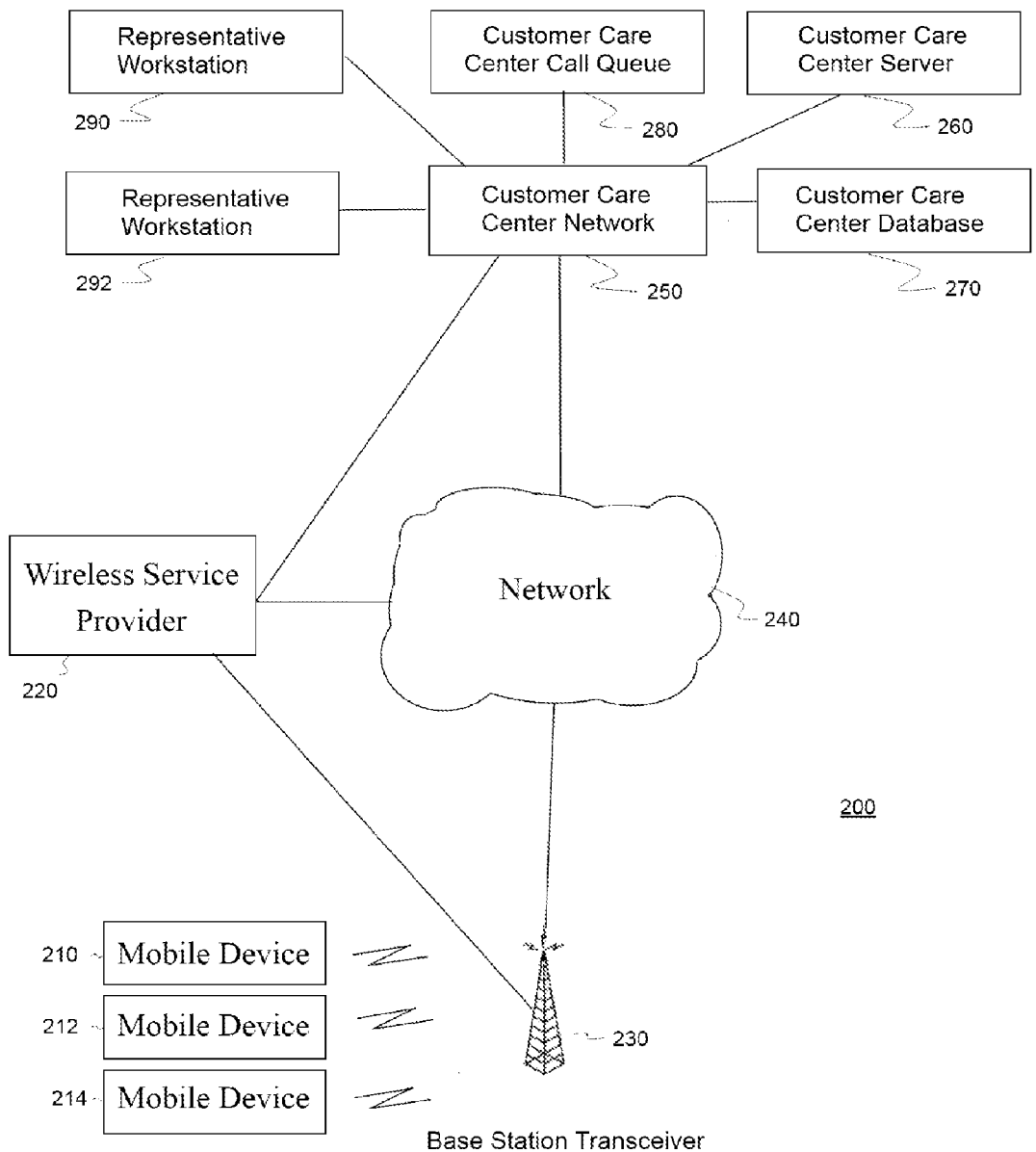
FIG. 2 is a simplified system schematic according to an embodiment of the disclosure.

FIG. 2 shows a wireless communications system 200. A plurality of mobile devices 210, 212, and 214 are representative of a very large number of mobile devices which may be served by a wireless service provider 220 via a base station transceiver 230. The mobile devices 210, 212, and 214 are more fully illustrated in FIG. 4 and described in the accompanying text below. The wireless service provider 220 may be a traditional cellular service provider, or other wireless service provider. The base station transceiver 230 may be a cellular voice and data transceiver, a WiFi system, or other wireless digital communication system. The external network 240 may be a cellular network, a telephone network, the Internet, or a combination thereof. Customer care center network 250 may connect to the mobile devices 210, 212, and 214 through external network 240 or through wireless service provider 220 equipment.

Connected to customer care center network 250 are the customer care center server 260, customer care center database 270, customer care center call queue 280, and customer care center representative workstations 290 and 292. The customer care server 260 and customer care center network 250 route calls from a mobile device to a customer care center call queue 280, for eventual connection to one of the customer care representative workstations 290, 292, so that the customer may speak with a customer care representative. The customer care center server 260 may monitor the progress of the call over the customer care center network 250, and provide queries to the workstations 290 and 292 when calls end. The customer care center server 260 may also request customer information and customer equipment information from the customer care center database 270. Customer care center server 260 and representative workstations 290 and 292 may be implemented by a computer configuration illustrated in FIG. 3. Customer care center call queue 280 and customer care center database 270 may be implemented as components or sets of instructions on the customer care center server, or as separate computer systems as illustrated in FIG. 3.

Figure 3:
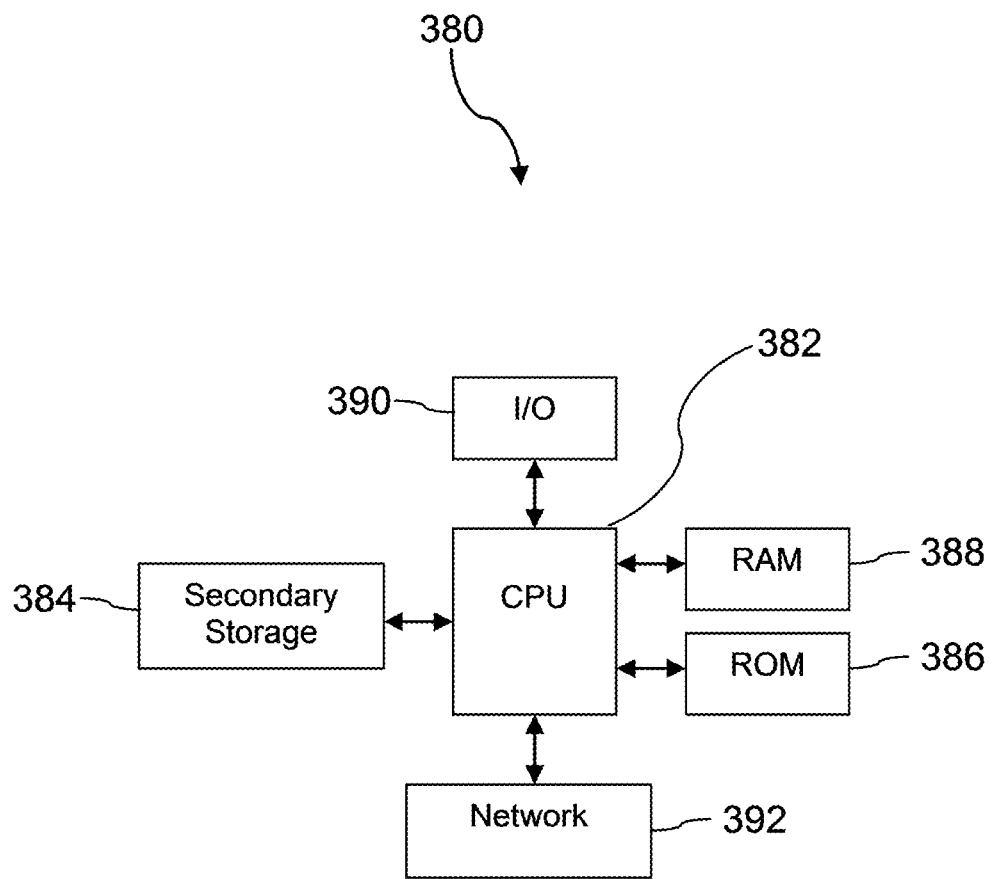
FIG. 3 is a block diagram of a computer system according to an embodiment of the disclosure.

FIG. 3 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

Figure 4:
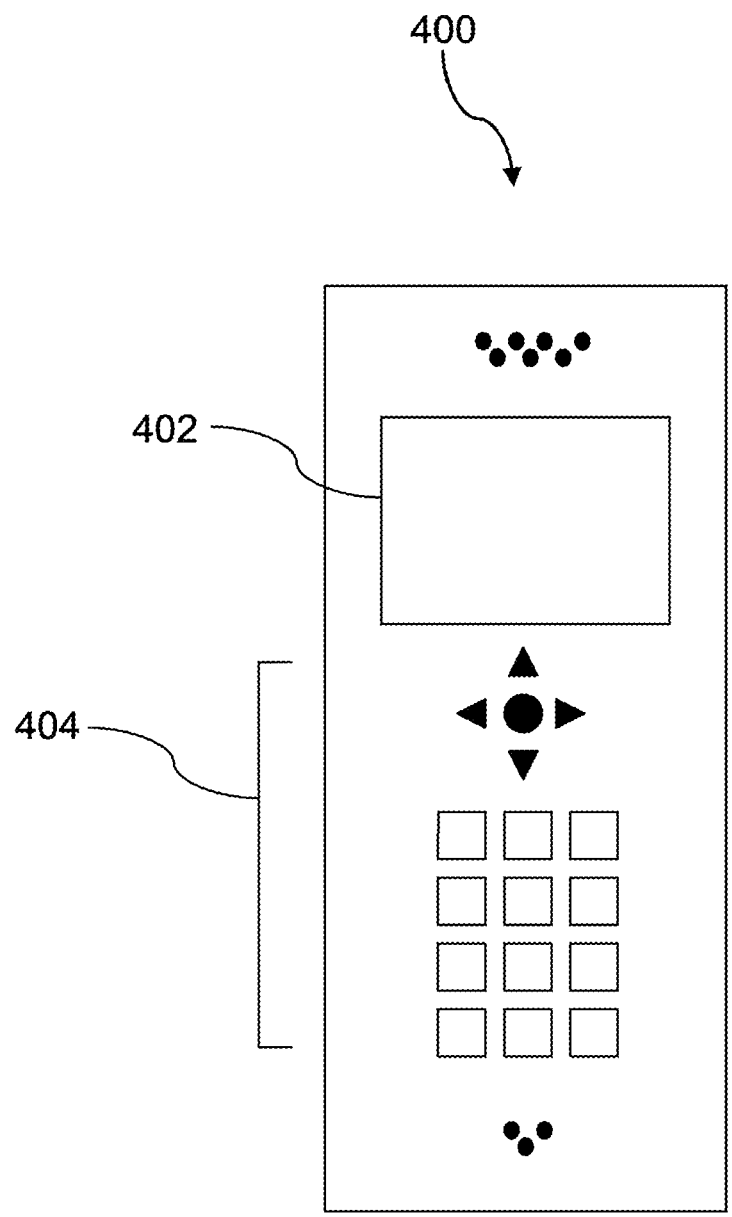
FIG. 4 is an illustration of a mobile communication device according to an embodiment of the disclosure.

FIG. 4 shows a wireless communications system including the mobile device 400. FIG. 4 depicts the mobile device 400, which is operable for implementing aspects of the present disclosure, but the present disclosure should not be limited to these implementations. Though illustrated as a mobile phone, the mobile device 400 may take various forms including a wireless handset, a pager, a personal digital assistant (PDA), a gaming device, or a media player. The mobile device 400 includes a display 402 and a touch-sensitive surface and/or keys 404 for input by a user. The mobile device 400 may present options for the user to select, controls for the user to actuate, and/or cursors or other indicators for the user to direct. The mobile device 400 may further accept data entry from the user, including numbers to dial or various parameter values for configuring the operation of the handset. The mobile device 400 may further execute one or more software or firmware applications in response to user commands. These applications may configure the mobile device 400 to perform various customized functions in response to user interaction. Additionally, the mobile device 400 may be programmed and/or configured over-the-air, for example from a wireless base station, a wireless access point, or a peer mobile device 400. The mobile device 400 may execute a web browser application which enables the display 402 to show a web page. The web page may be obtained via wireless communications with a base transceiver station, a wireless network access node, a peer mobile device 400 or any other wireless communication network or system.

Figure 5:
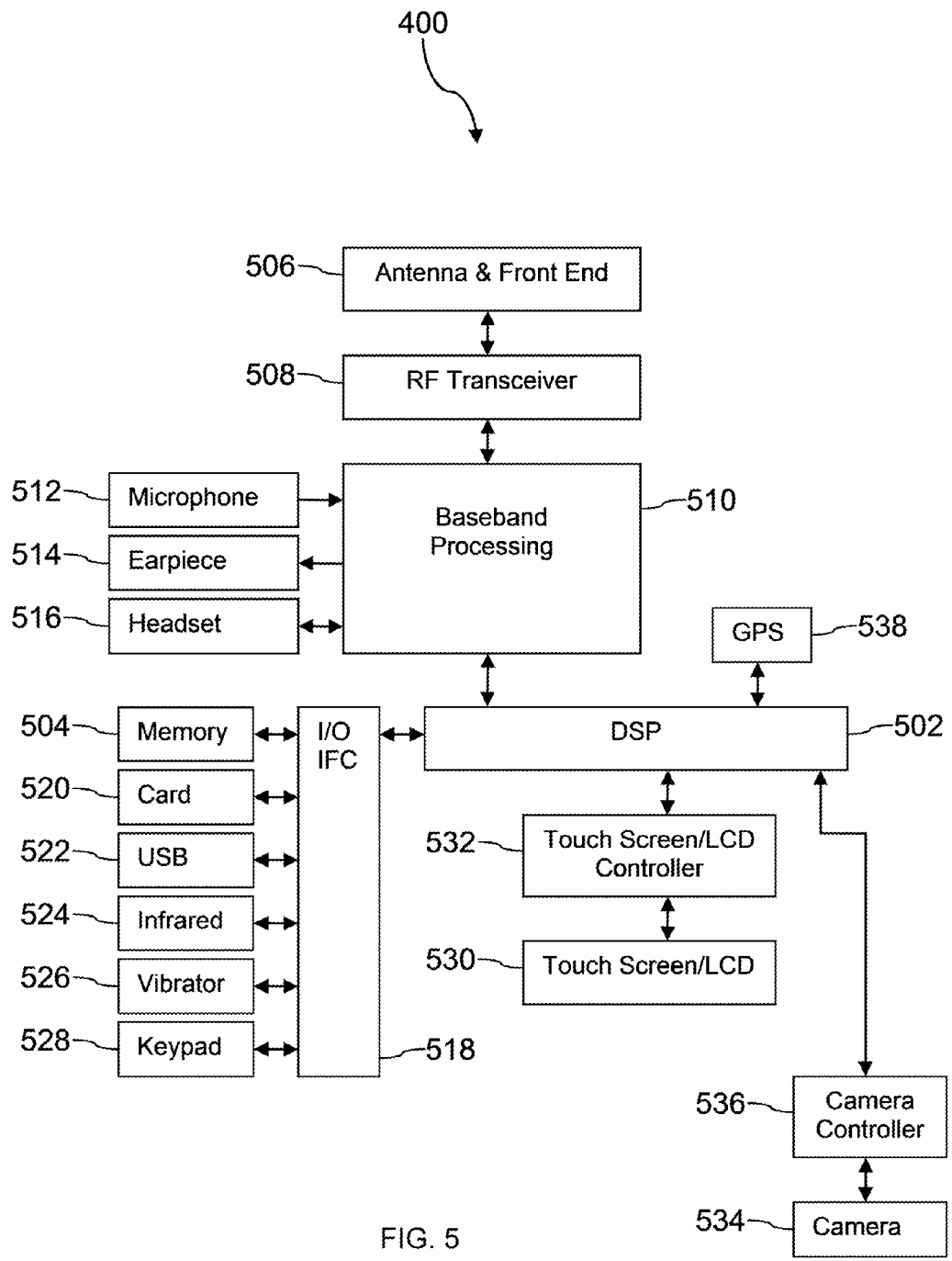
FIG. 5 is a block diagram of a mobile communication device according to an embodiment of the disclosure.

FIG. 5 shows a block diagram of the mobile device 400. While a variety of known components of handsets are depicted, in an embodiment a subset of the listed components and/or additional components not listed may be included in the mobile device 400. The mobile device 400 includes a digital signal processor (DSP) 502 and a memory 504. As shown, the mobile device 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 400 may include another kind of display that does not provide a touch sensitive screen. In an embodiment, the DSP 502 may communicate directly with the memory 504 without passing through the input/output interface 518. Additionally, in an embodiment, the mobile device 400 may comprise other peripheral devices that provide other functionality.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth® interface or an IEEE 802.11 compliant wireless interface may enable the mobile device 400 to communicate wirelessly with other nearby handsets and/or wireless base stations.

The keypad 528 couples to the DSP 502 via the interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 400 to determine its position.

Figure 6A:
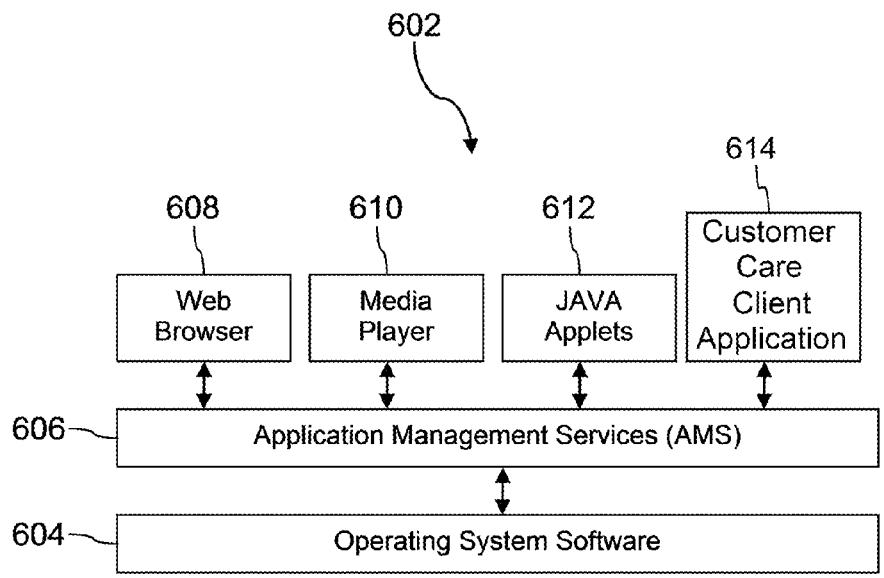
FIG. 6A is a block diagram of a software architecture of a mobile communication device according to an embodiment of the disclosure.

FIG. 6A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 400. Also shown in FIG. 6A are a web browser application 608, a media player application 610, and JAVA applets 612. The web browser application 608 may be executed by the mobile device 400 to browse content and/or the Internet, for example when the mobile device 400 is coupled to a network via a wireless link. The web browser application 608 may permit a user to enter information into forms and select links to retrieve and view web pages. The media player application 610 may be executed by the mobile device 400 to play audio or audiovisual media. The JAVA applets 612 may be executed by the mobile device 400 to provide a variety of functionality including games, utilities, and other functionality. Customer Care Client Application 614 is an application described more fully above, to monitor and assist calls to a customer care center.

Figure 6B:
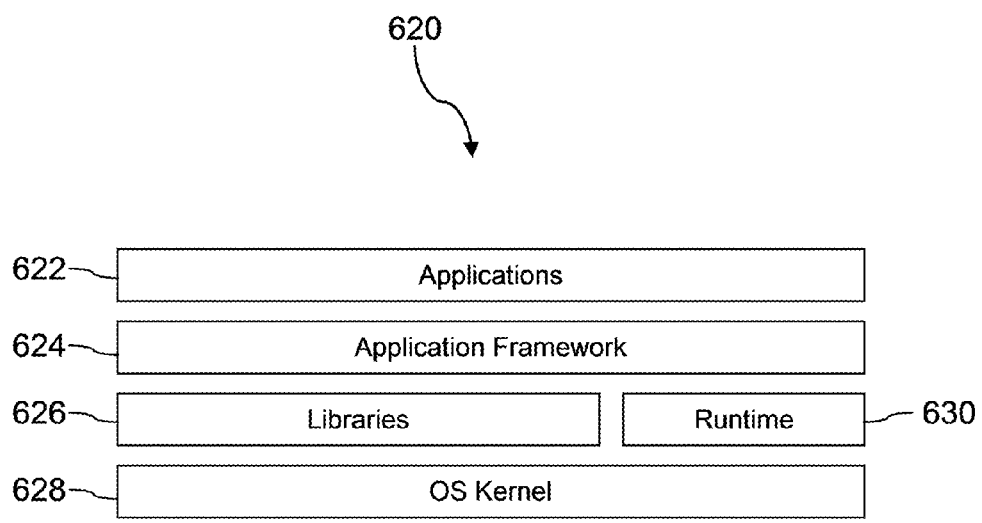
FIG. 6B is a block diagram of another software architecture of a mobile communication device according to an embodiment of the disclosure.

FIG. 6B illustrates an alternative software environment 620 that may be implemented by the DSP 502. The DSP 502 executes operating system software 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of processing a voice call from a mobile device to a customer care center, comprising:
   placing, from a mobile device by a customer, a call to a customer care center;
   ending the call;
   after ending the call, displaying, on the mobile device, a customer query about whether the call was completed to the satisfaction of the customer;
   waiting, at the mobile device, for up to a predetermined time for the customer response to the customer query;
   analyzing, on a processor at the customer care center, a status of a customer response by the customer to the customer query;
   recording, by the mobile device, an undetermined status for the customer response if the predetermined time for a response lapsed without a response by the customer to the customer query;
   after ending the call, displaying, at the customer care center, a representative query to a representative about whether the call was completed to the satisfaction of the representative;
   receiving, at the customer care center, a representative response to the representative query from the representative;
   determining that the call failed to complete successfully based on the customer response to the customer query and based on the representative response to the representative query;
   sending, by the customer care center, a customer care message to the mobile device in response to the status of the customer response being undetermined and the representative response being negative; and
   in response to the determination that the call failed to complete successfully, displaying, on the mobile device, the customer care message.

2. The method of claim 1, further comprising:
receiving, by the customer care center server, the call from the mobile device over an electronic infrastructure;
placing, by the customer care center server, the call in a queue for connection to the representative;
monitoring, by the customer care center server, the wait time of the call; and
monitoring, by the customer care center server, whether the call was successfully completed.

3. The method of claim 2, wherein the monitoring, by the customer care center server, whether the call was successfully completed includes monitoring whether the call was connected to the representative.

4. The method of claim 1, further comprising:
forwarding, by the customer care center, the representative response to the mobile device; and
forwarding, by the mobile device, an indication of whether the customer response was received and the nature of the customer response to the customer service center.

5. The method of claim 1, wherein the customer care message includes instructions for bypassing the end of a queue in a subsequent call to the customer care center.

6. The method of claim 1, further comprising prior to said placing, from the mobile device by the customer, the call to the customer care center:
identifying, by the mobile phone, a request by the customer for an outgoing call to the customer care center; and
launching, by the mobile device, a client application which is invoked exclusively for calls to the customer care center.

7. A method of processing a call from a mobile device to a customer care center, comprising:
receiving, by a customer care center server, a call from a mobile device over an electronic infrastructure;
placing, by the customer care center server, the call in a queue for connection to a representative;
monitoring, by the customer care center server, whether the call was successfully completed;
after ending the call, displaying, on the mobile device, a customer query about whether the call was completed to the satisfaction of a customer associated with the mobile device;
waiting, at the mobile device, for uP to a predetermined time for a customer response to the customer query;
recording, by the mobile device, an undetermined status for the customer response if the predetermined time for a response lapsed without a response by the customer to the customer query;
after ending the call, displaying, at the customer care center server, a representative query to the representative about whether the call was completed to the satisfaction of the representative;
receiving, at the customer care center server, a representative response to the representative query from the representative;
determining, by the customer care center server, that the call failed to complete successfully based at least on the customer response to the customer query and the representative response to the representative query; and
in response to the determination that the call failed to complete successfully based on the status of the customer response being undetermined and the representative response being negative, sending, by the customer care center server, a customer care message to the mobile device.

8. The method of claim 7, wherein the monitoring, by the customer care center server, whether the call was successfully completed includes monitoring whether the call was connected to the representative.

9. The method of claim 7, wherein the determining that the call failed to complete successfully is further based on a determination by the mobile device that the customer intentionally hung up or the call was dropped, or based on a determination by the customer care center server that the call was disconnected before the customer was connected to the representative.

10. A system for processing a call from a mobile device to a customer care center, comprising:
a network configured to route calls from mobile devices to a customer care center;
a mobile device configured to:
place a call to the customer care center,
after ending the call, display a customer query about whether the call was completed to the satisfaction of a customer associated with the mobile device,
wait for uP to a predetermined time for the customer response to the customer query, and
record an undetermined status for the customer response if the predetermined time for a response lapsed without a response by the customer to the customer query; and
a customer care center server comprising a processor and a non-transitory memory, configured to:
receive the call from the mobile device over an electronic infrastructure,
place the call in a queue for connection to a representative,
monitor whether the call was successfully completed,
after ending the call, display a representative query to the representative about whether the call was completed to the satisfaction of the representative,
receive a representative response to the representative query from the representative,
determine that the call failed to complete successfully based at least on the customer response to the customer query and the representative response to the representative query, and
in response to the determination that the call failed to complete successfully based on the status of the customer response being undetermined and the representative response being negative, send a customer care message to the mobile device.

11. The system of claim 10, wherein the configuration of the customer care center server to monitor whether the call was successfully completed includes a configuration to monitor whether the call was connected to the representative.

12. The system of claim 10, further comprising wherein the mobile device is further configured to:
place the call to the customer care center,
display a customer query about whether the call was completed to the satisfaction of a customer,
analyze a status of a customer response by the customer to the customer query, and
display the customer care message on the mobile device in response to the customer response being negative.

13. The system of claim 12, wherein the mobile device is further configured to:
monitor the total time of the call,
monitor whether the call was intentionally terminated by an input to the mobile device by the customer, and
display the customer care message in response to the call not being intentionally terminated by the input to the mobile device by the customer.

14. The system of claim 13, wherein the customer care message includes instructions for bypassing the end of the queue in a subsequent call to the customer care center.

* * * * *